United States Patent
Foebel et al.

(10) Patent No.: US 9,774,652 B2
(45) Date of Patent: Sep. 26, 2017

(54) SYSTEMS TO PROVIDE DATABASE UPDATES

(71) Applicants: Florian Foebel, Burstadt (DE); Bjoern Friedmann, Rheinmunster (DE); Boris Gruschko, Heidelberg (DE); Christian Mohr, Heidelberg (DE); Martin Strenge, Berlin (DE); Steffen Geissinger, Wiesloch (DE)

(72) Inventors: Florian Foebel, Burstadt (DE); Bjoern Friedmann, Rheinmunster (DE); Boris Gruschko, Heidelberg (DE); Christian Mohr, Heidelberg (DE); Martin Strenge, Berlin (DE); Steffen Geissinger, Wiesloch (DE)

(73) Assignee: SAP SE, Walldorf (DE)

( * ) Notice: Subject to any disclaimer, the term of this patent is extended or adjusted under 35 U.S.C. 154(b) by 245 days.

(21) Appl. No.: 14/310,781

(22) Filed: Jun. 20, 2014

(65) Prior Publication Data

US 2015/0169648 A1    Jun. 18, 2015

Related U.S. Application Data

(60) Provisional application No. 61/915,622, filed on Dec. 13, 2013.

(51) Int. Cl.
*G06F 17/30* (2006.01)
*H04L 29/08* (2006.01)
*H04L 29/06* (2006.01)

(52) U.S. Cl.
CPC ........ *H04L 67/02* (2013.01); *G06F 17/30365* (2013.01); *H04L 67/42* (2013.01)

(58) Field of Classification Search
CPC ... H04L 67/02; H04L 29/06108; H04L 67/42; G06F 17/30365
USPC ........ 707/609; 709/203, 217, 218, 219, 227, 709/230
See application file for complete search history.

(56) References Cited

U.S. PATENT DOCUMENTS

| | | | |
|---|---|---|---|
| 7,702,646 B2 * | 4/2010 | Rabines | G06F 17/30554 707/805 |
| 8,352,450 B1 * | 1/2013 | Mraz | G06F 17/30578 707/705 |
| 2004/0103199 A1 * | 5/2004 | Chao | G06F 17/30902 709/228 |
| 2007/0192325 A1 * | 8/2007 | Morris | H04L 67/24 |
| 2012/0066363 A1 * | 3/2012 | Somogyi | G06F 17/30286 709/223 |
| 2012/0158825 A1 * | 6/2012 | Ganser | G06F 17/3089 709/203 |

(Continued)

*Primary Examiner* — Hares Jami
(74) *Attorney, Agent, or Firm* — Buckley, Maschoff & Talwalkar LLC (57) ABSTRACT

A system includes establishment of a WebSocket connection at a WebSocket endpoint of the system with a WebSocket client, registration of a callback at the WebSocket endpoint for an event associated with an update to data of the database, identification of an update to the data of the database at an HTTP endpoint of the system, sending, in response to the identification of the update, a trigger event from the HTTP endpoint, reception of the trigger event at the WebSocket endpoint, and execution of the callback by the WebSocket endpoint to transmit the update to the Web-Socket client.

6 Claims, 6 Drawing Sheets (56) References Cited

U.S. PATENT DOCUMENTS

| | | | |
|---|---|---|---|
| 2014/0089485 A1* | 3/2014 | Boberg | H04W 8/245 709/223 |
| 2014/0223452 A1* | 8/2014 | Santhanam | H04L 67/141 719/328 |
| 2014/0279871 A1* | 9/2014 | Ochoa | G06F 17/30578 707/610 |

* cited by examiner

SYSTEMS TO PROVIDE DATABASE UPDATES

CROSS REFERENCE TO RELATED APPLICATIONS

This application claims benefit to and priority of U.S. Patent Application Ser. No. 61/915,622, filed Dec. 13, 2013, the contents of which are hereby incorporated by reference in their entirety for all purposes.

BACKGROUND

According to conventional Web-based architectures, a client application (e.g., a Web browser) requests information from a Web server, the Web server retrieves the information from a database system (e.g., via an intermediate application server), and the Web server provides the information to the client application. This request-response protocol does not allow the Web server to proactively notify the client application of changes to the data of the database system.

It may be desirable to notify Web-based client applications of changes in database content. This notification may be provided by polling database content via periodically executed queries, which introduces an unnecessary and possibly overwhelming load onto the database. Alternatively, all update traffic may be provisioned through the application server, which requires the application server to examine all incoming data traffic and does not account for applications connecting to the database via standard interfaces.

Similarly, the request/response paradigm of HyperText Transfer Protocol (HTTP) prevents application servers from providing database updates to a client application without a pending client request. Providing updates via polling would introduce an unnecessary load and network traffic, while chunked responses which provide updates as an endless list of chunks would lead to problems in HTTP infrastructure.

DETAILED DESCRIPTION

The following description is provided to enable any person in the art to make and use the described embodiments and sets forth the best mode contemplated for carrying out some embodiments. Various modifications, however, will remain readily apparent to those in the art.

Figure 1:
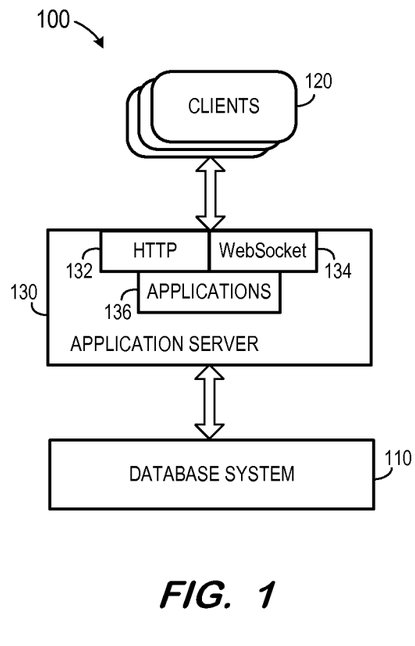
FIG. 1 is a block diagram of a system according to some embodiments.

FIG. 1 is a block diagram of system 100 according to some embodiments. System 100 includes database system 110, clients 120, and application server 130. Generally, application server 130 receives queries from clients 120 and provides results to clients 120 based on data of database system 110. Database system 110 and application server 130 may support multi-tenancy to separately support multiple unrelated clients by providing multiple logical database systems which are programmatically isolated from one another.

Database system 110 implements an "in-memory" database, in which a full database stored in volatile (e.g., non-disk-based) memory (e.g., Random Access Memory). The full database may be persisted in and/or backed up to fixed disks (not shown). Embodiments are not limited to an in-memory implementation. For example, the full database may be stored in one or more fixed disks (e.g., persistent memory for storing their respective portions of the full database) and accessed during operation when needed.

Database system 110 may comprise any query-responsive data source or sources that are or become known, including but not limited to a structured-query language (SQL) relational database management system. Database system 110 may comprise a relational database, a multi-dimensional database, an eXtendable Markup Language (XML) document, or any other data storage system storing structured and/or unstructured data. Database system 110 may be distributed among several relational databases, dimensional databases, and/or other data sources. Embodiments are not limited to any number or types of data sources.

In some embodiments, data of database system 110 may comprise one or more of conventional tabular data, row-based data, column-based data, and object-based data. Moreover, the data of database system 110 may be indexed and/or selectively replicated in an index to allow fast searching and retrieval thereof.

Application server 130 generally provides data of database system 110 to reporting clients, such as clients 120, in response to queries received therefrom. More specifically, application server 130 includes HTTP interface 132 and WebSocket interface 134, through which clients 120 communicate with applications 136 executing on application server 130. HTTP interface 132 supports a request/response protocol over Transmission Control Protocol (TCP) as described above, while WebSocket interface 134 supports full-duplex communications between clients 120 which also implement the WebSocket protocol and application server 130 over a single TCP connection.

Application server 130 may be separated from or closely integrated with database system 110. A closely-integrated application server 130 may enable execution of server applications completely on the database platform, without the need for an additional application server.

In some embodiments, application server 130 receives an instruction from a client 120 to analyze a set of values, such as the values stored in a column of a database table. Application server 130 generates a statement execution plan based on the instruction and the plan is forwarded to database system 110, which executes the plan and returns a dataset based on the plan. Application server 130 then returns the dataset to the client 120. Embodiments are not limited thereto.

Each of clients 120 may comprise one or more devices executing program code of a software application for presenting user interfaces to allow interaction with application server 130. Presentation of a user interface may comprise any degree or type of rendering, depending on the type of user interface code generated by application server 130. For example, a client 120 may execute a Web Browser to request and receive a Web page (e.g., in HTML format) from application server 130 via HTTP, HTTPS, and/or WebSocket, and may render and present the Web page according to known protocols. One or more of clients 120 may also or alternatively present user interfaces by executing a standalone executable file (e.g., an .exe file) or code (e.g., a JAVA applet) within a virtual machine.

Figure 2:
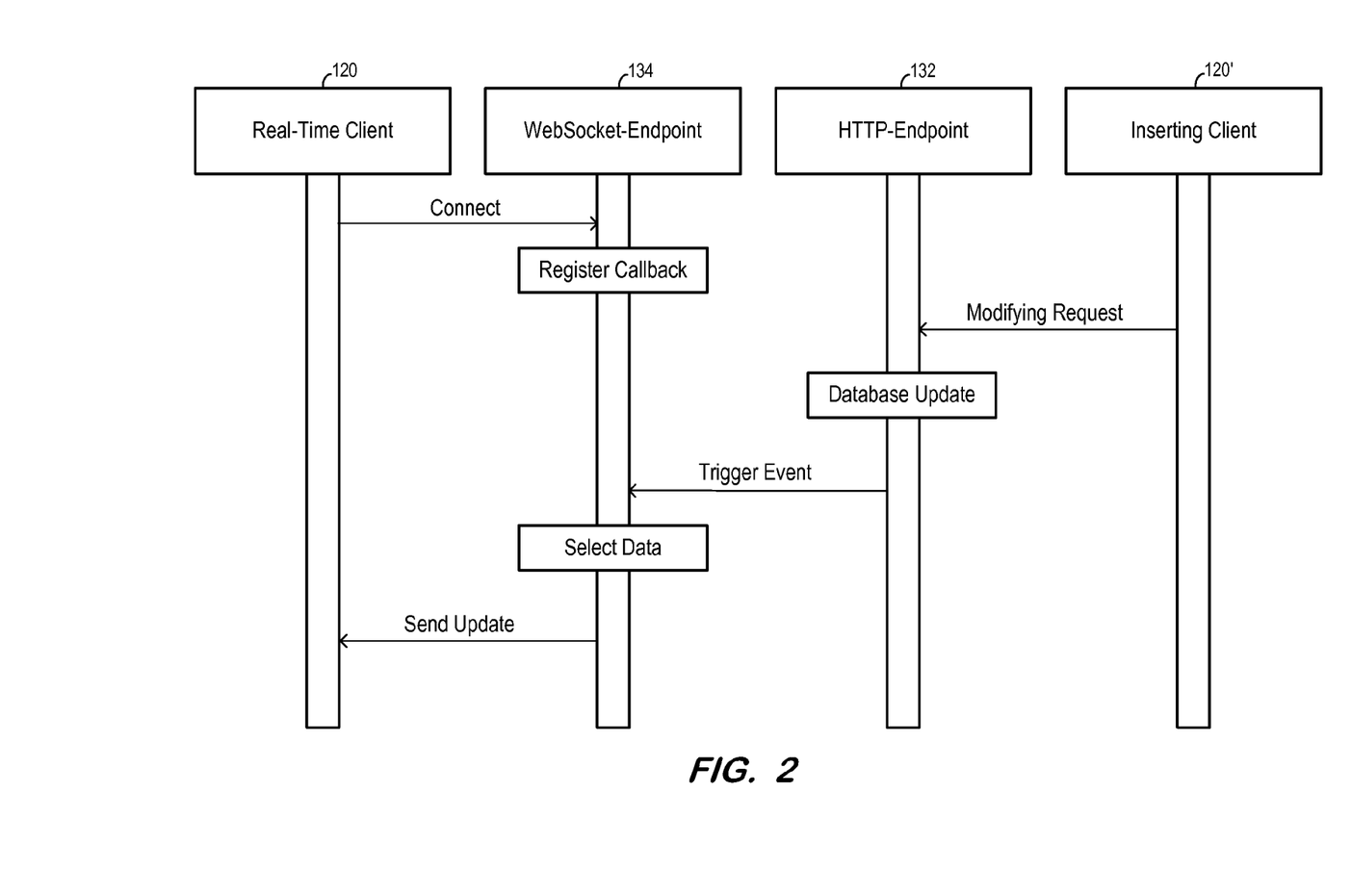
FIG. 2 is a sequence diagram according to some embodiments.

FIG. 2 is a sequence diagram according to some embodiments. All processes mentioned herein may be executed by various hardware elements and/or embodied in processor-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

As referred to above, the WebSocket protocol provides a full duplex channel which enables an application server to send updates to an HTTP client at any time. In order to provide database updates to such clients, the application server would be required to regularly poll the database system. A lightweight cross-session event mechanism is presented herein to address the foregoing. The mechanism according to some embodiments is depicted in FIG. 2.

Initially, an application developer defines a "newdata" event as part of an application (e.g., one of applications 136) in an .xsapp file:

```
{
    "events": [ "newdata" ]
}
```

Next, JavaScript code executed on client 120, which is a WebSocket client, connects to a WebSocket-endpoint 134 and registers a callback for the defined event:

```
function mycallback( ) {
    // select data and push update
}
$.application.onnewdata = myCallback;
```

An inserting client application 120' then presents a request to modify the data of database system 110. In response, HTTP-endpoint 132 determines the database update, determines that the triggering conditions have therefore been met, and sends a trigger event to WebSocket-endpoint 134. Another piece of JavaScript code triggers the execution of the callback by WebSocket-endpoint 134 after inserting data into its tables:
$.application.triggernewdata( );

According to some embodiments, the event may be triggered by an inserting OData-service with JavaScript callbacks or a server-side JavaScript HTTP-endpoint. In some embodiments, and for security purposes, the scope of the event may be limited to one application of application server 130, the event may not be triggered from an entity outside application server 130, and the event may not carry any data.

Database Triggers are notification mechanisms which are capable of providing content updates to Stored Procedures running within a database instance, but which do not provide content updates to applications running in an application server. The present inventors have developed a system to extend the notifications provided by a Database Trigger to applications running in an application server.

Figure 3:
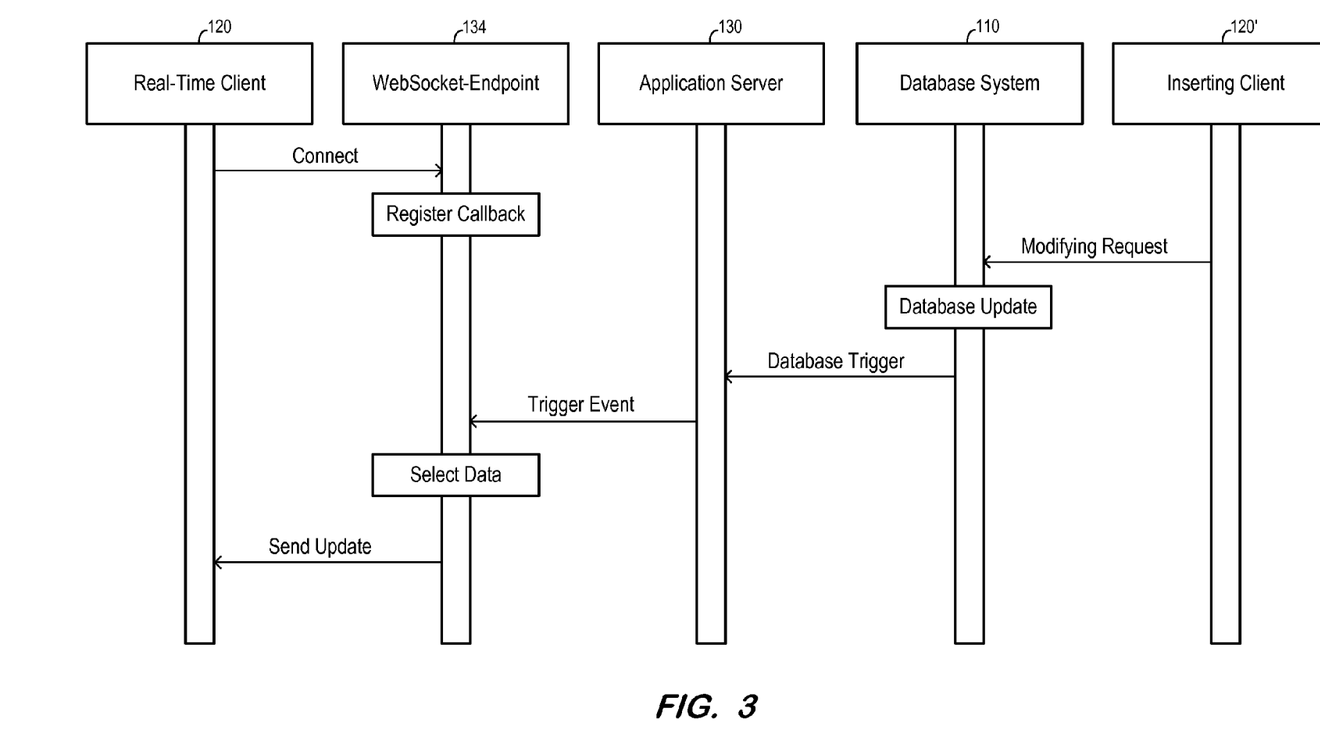
FIG. 3 is a sequence diagram according to some embodiments.

For example, an application developer defines events as part of an application (e.g., one of applications 136) in an .xsapp file:

```
{
    "events": [ "newdata" ]
}
```

Next, as illustrated in FIG. 3, a Database Trigger is registered by real-time client 120 to call the application event handler if the triggering conditions (i.e., newdata) are met:
CREATE TRIGGER EXAMPLE.EXAMPLE on SCHEMA.TABLE notifying newdata;

Inserting client 120' then presents a request to modify the data of database system 110. Inserting client 120' may use any standard database interface to present the request. Database system 110 updates the data, determines that the triggering conditions have therefore been met, and sends a Database Trigger to application server 130. Application server 130, in turn, sends a trigger event to WebSocket-endpoint 136, which selects the data and sends an update including the data to real-time client 120. Accordingly, real-time client 120 lies dormant without issuing any pending requests until the trigger conditions are met.

Figure 4:
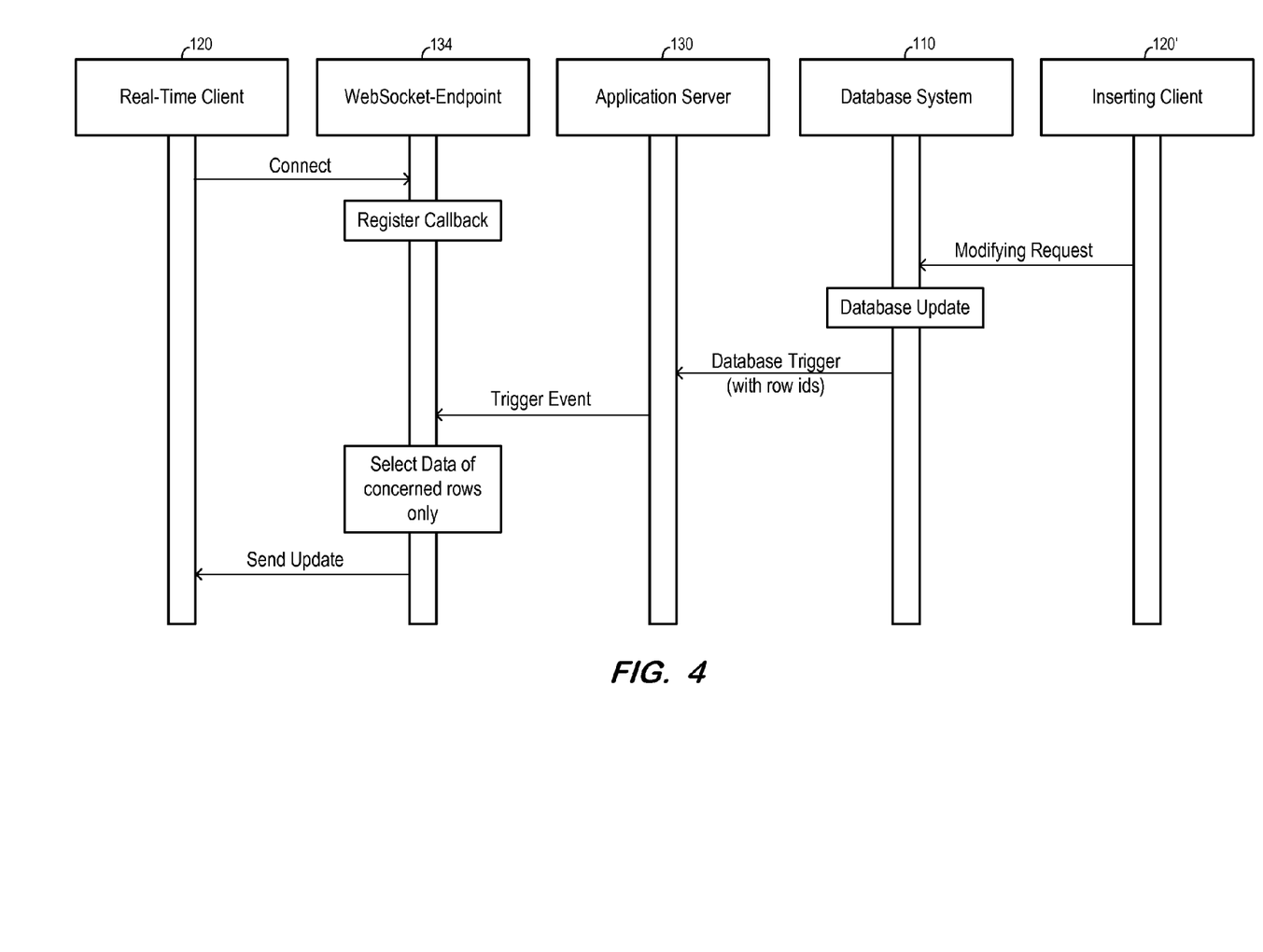
FIG. 4 is a sequence diagram according to some embodiments.

It may not be desirable to attach inserted/updated data to the update event in the case of fine-grained updates, because the inserting user is not necessary the same as the user subscribing to the update events. FIG. 4 illustrates a sequence for addressing the foregoing. Again, an application developer defines events as part of an application in the .xsapp file:

```
{
    "events": [ "newdata" ]
},
``` and a Database Trigger is registered to call the application event handler in case the triggering conditions occur:
CREATE TRIGGER EXAMPLE.EXAMPLE on SCHEMA.TABLE notifying newdata;

Inserting client 120' then presents a request to modify the data of database. Database system 110 updates the data, determines that the triggering conditions have therefore been met, and sends a Database Trigger to application server 130. The Database Trigger also includes the row ids of the updated database table rows. Thereafter, real-time client 120 can issue a SELECT statement selecting only the updated data by providing a corresponding row id as part of a WHERE condition of the SELECT statement. Because such a SELECT statement is executed using application user privileges, real-time client 120 can only see the data the user is allowed to see.

Figure 5:
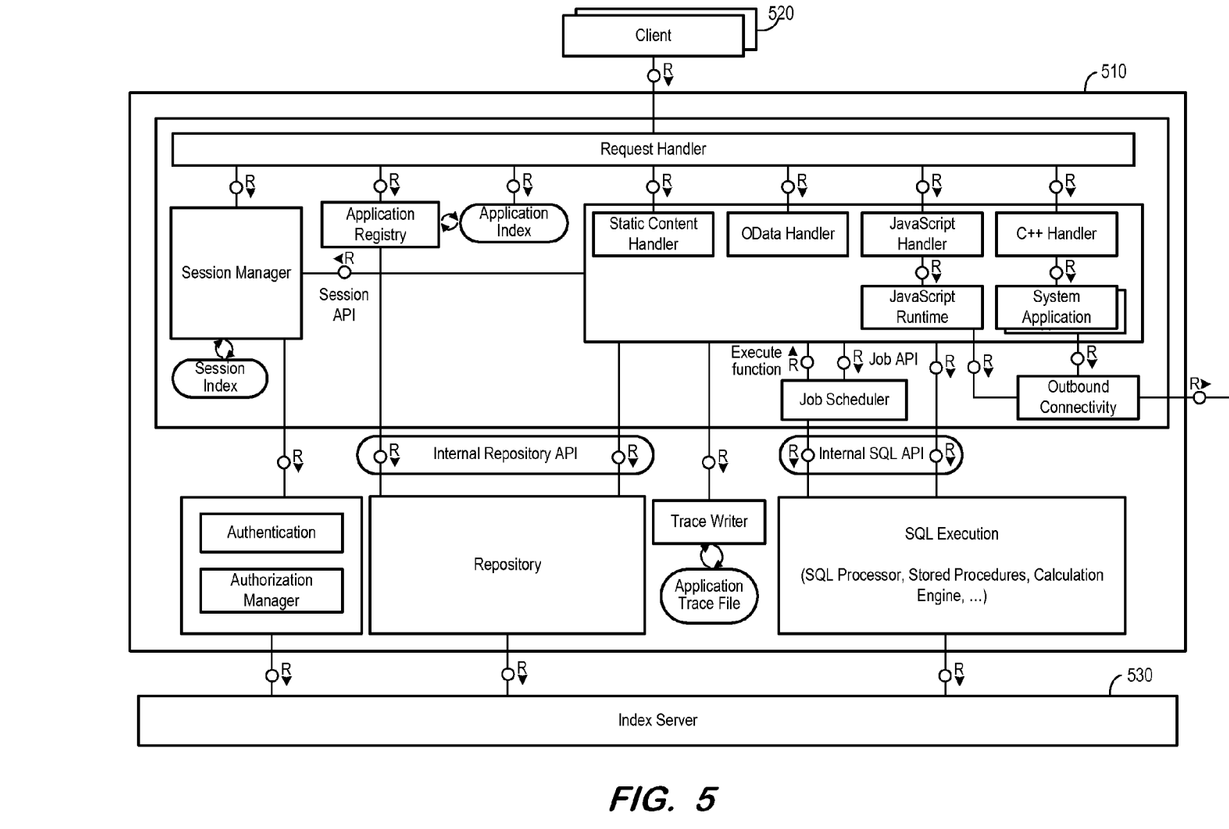
FIG. 5 is a detailed block diagram of an application server according to some embodiments.

FIG. 5 is a detailed block diagram of Web application server 510 according to some embodiments. Server 510 may comprise an implementation of application server 130 of FIG. 1, while index server 530 may comprise an implementation of database system 110.

Incoming requests from clients 520 are received by the request handler. The request handler first determines the application to which the requested resource belongs by invoking the application registry, which maintains a list of all active applications. The application registry initially reads this information from runtime storage tables located in the master index server and caches the information in its application index. After the application is determined, optional Uniform Resource Locator (URL) rewriting rules are applied. URL rewriting rules can be defined for each application to map between external URLs and corresponding internal technical URLs.

The request handler then invokes the session manager. The session manager either relates the request to an existing session or starts a new session. The session manager is responsible for session authentication. A developer may specify, on the package level, whether authentication is required for accessing the resources. Server 510 may support several authentication mechanisms, including but not limited to SAML, SAP assertion ticket, SAP logon ticket, Kerberos, X.509 certificates, and user and password using HTTP basic authentication or form-based logon.

After successful authentication, the request handler forwards the request to the responsible resource handler of server 510. FIG. 5 illustrates several different resource handlers for different types of resources.

The static content handler is called for content such as Hypertext Markup Language (HTML) files, client side scripts, or images. The static content handler retrieves the resources from the runtime storage.

The OData handler is invoked if the requested resource belongs to an OData service. If the client requests the service definition, the OData handler returns a document including the metadata about the service. This document is generated during the activation of the service descriptor which was written by the developer. If the client requests actual data, the OData handler constructs the required database statements and invokes them using the internal SQL API. The OData handler transforms the query results into the format requested by the client, which can be either Atom (content type "atom+XML") or JSON. As explained above, developers can specify application specific code to be called for validating or executing OData write requests. In this case the OData handler calls the specified code, which may be SQLScript procedures or JavaScript functions.

The JavaScript handler is invoked if the requested resource is a server-side JavaScript program. The JavaScript handler reads the runtime object with the JavaScript byte code from the runtime storage tables, and invokes the JavaScript runtime for executing it. The JavaScript runtime also contains an implementation of JavaScript APIs. If such an API is called, the JavaScript runtime invokes the responsible component, such as the session manager, the outbound HTTP client, the trace writer, or the internal SQL API.

The outbound HTTP client is used to send HTTP/S requests to an external server. The connection details of the remote server need to be specified in advance by creating an HTTP destination configuration. The internal SQL API invokes an SQL execution chain. The SQL executor and the calculation engine in server 510 delegate the actual data operations to the index server where the data resides.

The C++ handler is responsible for resources and services exposed by system applications that are written in C++. These system applications have the same lifecycle as the database platform and are part of the database build. One example is a Direct Extractor Connection (DXC) that allows DataSource extractor-based data replication between clients and the database platform via HTTP. DataSource extractors in the client are redirected to send extracted data to the database platform system via HTTP. The data is received by the DXC system application in the XS server, which stores it in the database.

Figure 6:
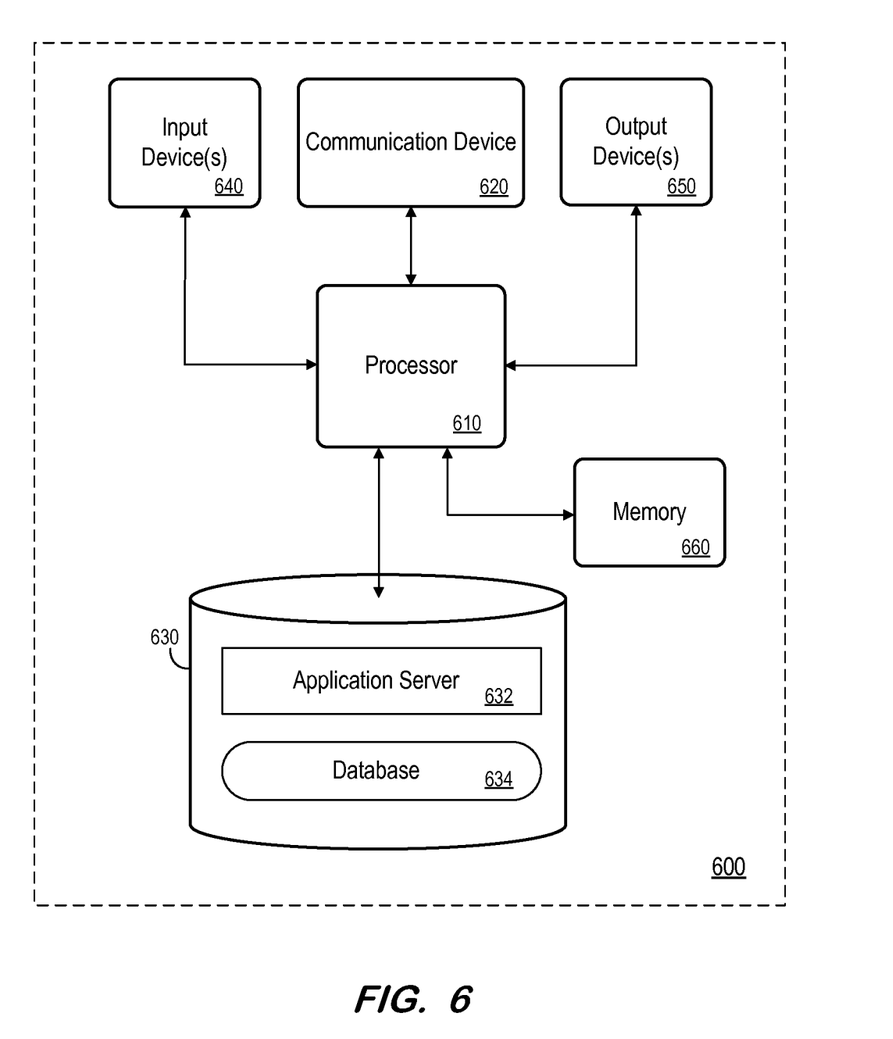
FIG. 6 is a block diagram of an apparatus according to some embodiments.

FIG. 6 is a block diagram of apparatus 600 according to some embodiments. Apparatus 600 may comprise a general-purpose computing apparatus and may execute program code to perform any of the functions described herein. Apparatus 600 may comprise an implementation of application server 130 and database system 110 of FIG. 1 in some embodiments. Apparatus 600 may include other unshown elements according to some embodiments.

Apparatus 600 includes processor 610 operatively coupled to communication device 620, data storage device 630, one or more input devices 640, one or more output devices 650 and memory 660. Communication device 620 may facilitate communication with external devices, such as a reporting client, or a data storage device. Input device(s) 640 may comprise, for example, a keyboard, a keypad, a mouse or other pointing device, a microphone, knob or a switch, an infra-red (IR) port, a docking station, and/or a touch screen. Input device(s) 640 may be used, for example, to enter information into apparatus 600. Output device(s) 650 may comprise, for example, a display (e.g., a display screen) a speaker, and/or a printer.

Data storage device 630 may comprise any appropriate persistent storage device, including combinations of magnetic storage devices (e.g., magnetic tape, hard disk drives and flash memory), optical storage devices, Read Only Memory (ROM) devices, etc., while memory 660 may comprise Random Access Memory (RAM).

Data server 632 may comprise program code executed by processor 610 to cause apparatus 600 to perform any one or more of the processes described herein. Embodiments are not limited to execution of these processes by a single apparatus. Database 634 may include database data as described above. As also described above, database data (either cached or a full database) may be stored in volatile memory such as memory 660. Data storage device 630 may also store data and other program code for providing additional functionality and/or which are necessary for operation of apparatus 600, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
a memory storing:
   a database; and
   a processor to execute the processor-executable process steps to cause the system to:
establish a WebSocket connection at a WebSocket endpoint of the system with a WebSocket client;
register a callback at the WebSocket endpoint for an event associated with an update to data of the database;
receive a request via an HTTP endpoint at an application server to update data of the database;
identify an update to the data of the database by the HTTP endpoint of the system, wherein the application server is closely-integrated with a database system;
in response to the identification of the update, send a database trigger event from the database system to an application running in the application server of the system, wherein the database trigger event provides a content update to the application running in the application server;
receive a trigger event at the WebSocket endpoint from the application server via the HTTP endpoint, wherein the trigger event comprises row ids of a database table; and
execute the callback by the WebSocket endpoint to transmit the update to the WebSocket client, wherein execution of the callback by the WebSocket endpoint comprises selection of data of the database associated with the row ids.

2. The system according to claim 1, wherein the row ids of the trigger event comprise row ids of database table rows which were updated by the update.

3. A computer-implemented method comprising:
establishing a WebSocket connection at a WebSocket endpoint of the system with a WebSocket client;
registering a callback at the WebSocket endpoint for an event associated with an update to data of a database;
receiving a request via an HTTP endpoint at an application server to update data of the database;
identifying an update to the data of the database by the HTTP endpoint of the system, wherein the application server is closely-integrated with a database system;
in response to the identification of the update, sending a database trigger event from the database system to an application running in the applications server of the system, wherein the database trigger event provides a content update to the application running in the application server;
receiving a trigger event at the WebSocket endpoint from the application server via the HTTP endpoint, wherein the trigger event comprises row ids of a database table; and
executing the callback by the WebSocket endpoint to transmit the update to the WebSocket client, wherein execution of the callback by the WebSocket endpoint comprises selection of data of the database associated with the row ids.

4. The method according to claim 3, wherein the row ids of the trigger event comprise row ids of database table rows which were updated by the update.

5. A non-transitory computer-readable medium storing program code, the program code executable by a computer system to cause to the computer system to:
establish a WebSocket connection at a WebSocket endpoint of the system with a WebSocket client;
register a callback at the WebSocket endpoint for an event associated with an update to data of the database;
receive a request via an HTTP endpoint at an application server to update data of the database;
identify an update to the data of the database by the HTTP endpoint of the system, wherein the application server is closely-integrated with a database system;
in response to the identification of the update, send a database trigger event from the database system to an application running in the applications server of the system, wherein the database trigger event provides a content update to the application running in the application server;
receive a trigger event at the WebSocket endpoint from the application server via the HTTP endpoint, wherein the trigger event comprises row ids of a database table; and
execute the callback by the WebSocket endpoint to transmit the update to the WebSocket client, wherein execution of the callback by the WebSocket endpoint comprises selection of data of the database associated with the row ids.

6. The medium according to claim 5, wherein the row ids of the trigger event comprise row ids of database table rows which were updated by the update.

* * * * *